Sept. 20, 1955     D. B. NOLAND ET AL     2,718,583
WATER-HEATER TANK OF REINFORCED PLASTIC AND
METHOD AND APPARATUS FOR MAKING THE SAME
Filed Nov. 18, 1952     2 Sheets—Sheet 1
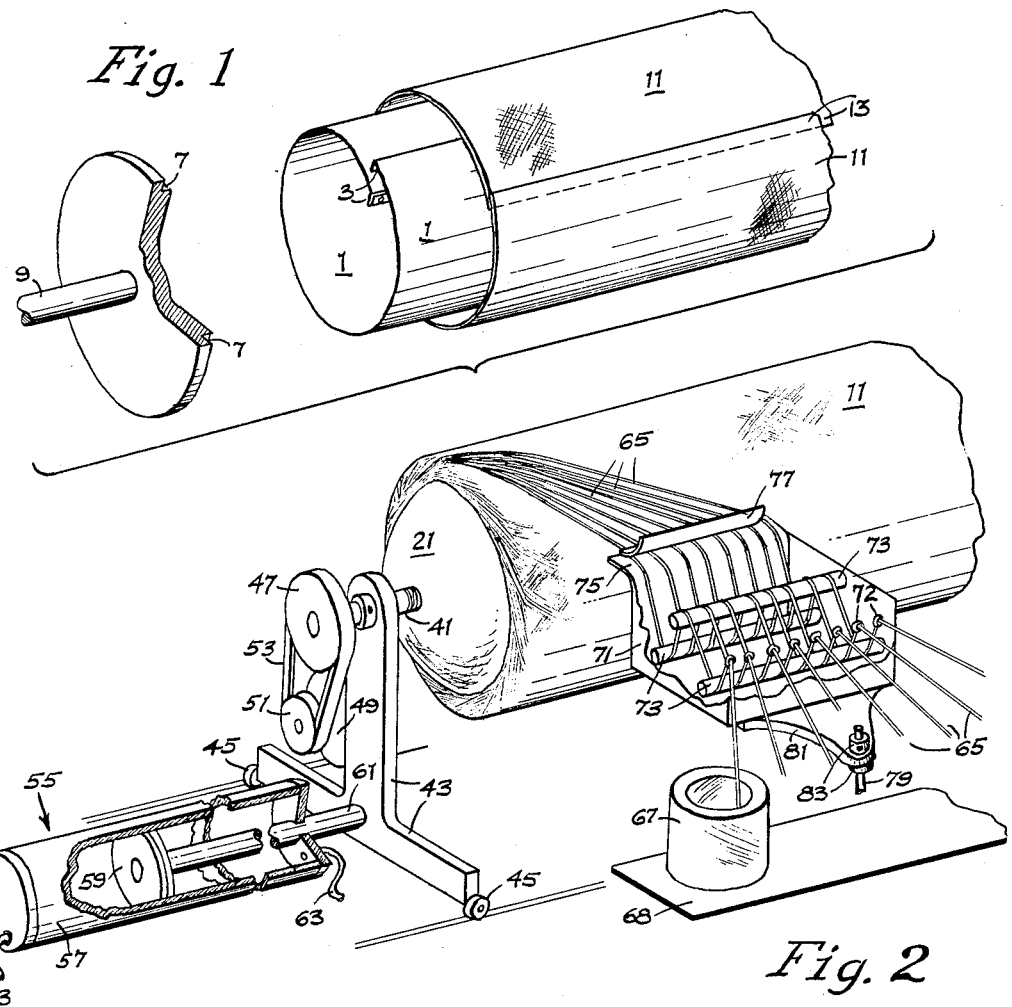
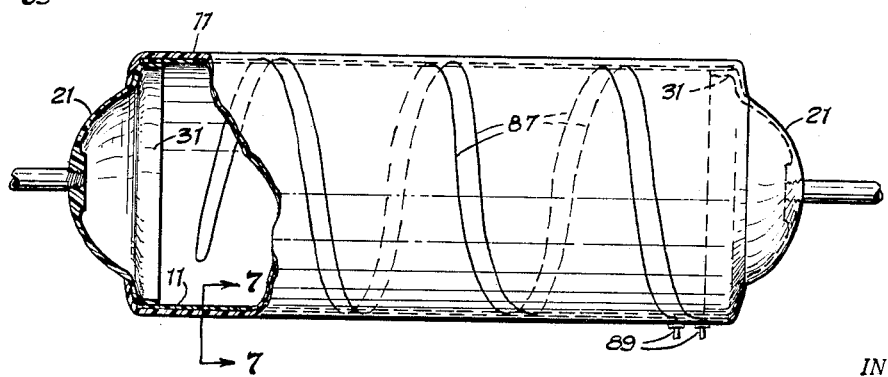
INVENTORS:
David B. Noland &
John G. Briggs
BY
Ralph F. Staubly
ATTORNEY.

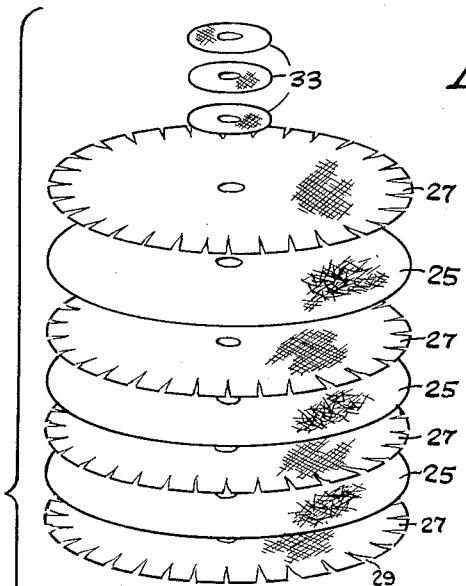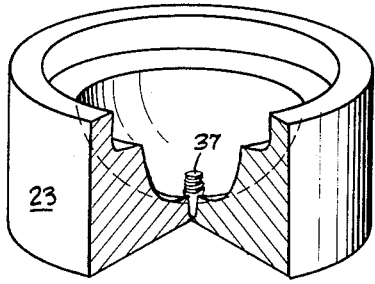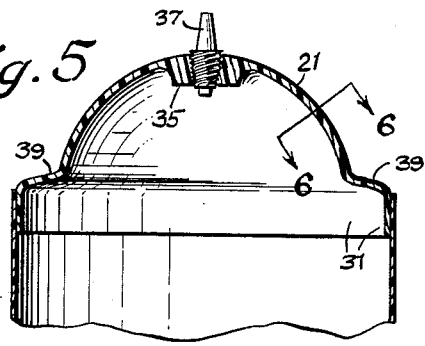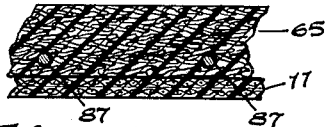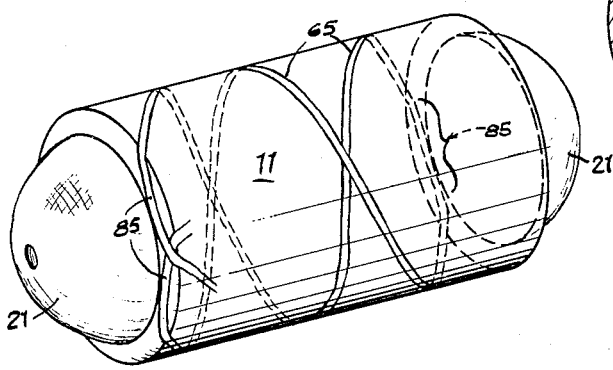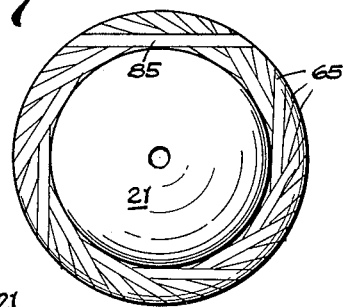

United States Patent Office 2,718,583
Patented Sept. 20, 1955

2,718,583

WATER-HEATER TANK OF REINFORCED PLASTIC AND METHOD AND APPARATUS FOR MAKING THE SAME

David B. Noland and John G. Briggs, Nashville, Tenn.

Application November 18, 1952, Serial No. 321,088

18 Claims. (Cl. 219—38)

This invention relates to a water-heater tank of reinforced plastic and method and apparatus for making the same. More specifically it relates to a plastic water-heater tank formed by helically winding subsequently-setting-plastic-impregnated glass-fiber "roving" cords over and around convex tank heads and helically around a cylindrical lining shell connected therebetween, with or without an electric resistance wire embedded in the tank walls so formed, and a method and apparatus for making the same.

Experimental tanks formed of plastics having chopped glass fibers mixed therein, or incorporated therein as one or more felted or matted laminae, have proven unsatisfactory both as to water-tightness and bursting strength. Both of these short-comings, we discovered, stemmed from the manner in which the chopped glass fibers were incorporated into the plastic material, being mixed loosely therein or laid therein as matted or felted laminae. This construction produced capillary leakage paths along those fibers that extended transversely thru the tank walls; and the absence of tension in the re-inforcing fibers greatly reduced both the bursting strength for a given wall thickness and the resistance to cracking. It was also found that the ends of cylindrical tanks could not be riveted, cemented or otherwise conventionally attached to the side walls so as not to pull loose under the hydrostatic or surge pressures of normal use. Moreover, in reducing the invention to a practical form we developed a specially designed head to give greater strength, and to provide anchor shoulders for the reinforcing strands, so that the tank could be wound into a unitary structure.

We consider that this invention consisted of three general phases: (1) discovery and recognition of the causes of failure of prior-art experiments, (2) conceiving the generic solution of the problem, and (3) developing the generic concepts into a specific practical commercial tank and its method of fabrication.

Accordingly, it is an object of this invention to provide a strong, durable and leak-proof water-heater tank of re-inforced plastic, and a practical method of making the same.

It is another object to provide a plastic water-heater tank having pretensioned reinforcing filaments therein, by helically winding plastic-impregnated "roving" cords of glass fibers over a cylindrical liner, and to provide a method and apparatus therefor.

It is a further object to provide such a tank with a highly effective and economical electric heater by embedding a helically would resistance wire in the side walls thereof while they are being formed.

It is still another object to provide a tank of conventional shape in which the tank ends are rigidly connected to the side walls by extensions of the side-wall re-inforcing cords passing over shoulders on said ends.

These and other objects and advantages of the invention will become apparent as the following detailed description proceeds.

In the drawings, which illustrate a preferred embodiment of the invention and method and apparatus for making the same, and in which like reference characters designate the same parts thruout the several views:

Fig. 1 is a fragmentary exploded perspective view of the forms employed in making the tank liner.

Fig. 2 is a somewhat schematic perspective view of the apparatus employed in fabricating the tank.

Fig. 3 is an elevation, partly in axial section, of a finished tank.

Fig. 4 is an expanded perspective view showing how the plastic-impregnated laminae of the tank heads are assembled prior to being die-pressed into final shape.

Fig. 5 is an elevational view of a tank head in axial section.

Fig. 6 is an enlarged sectional view of the head wall taken on the line 6—6 of Fig. 5.

Fig. 7 is an enlarged sectional view of the tank side wall taken on the line 7—7 of Fig. 3.

Fig. 8 is schematic perspective view showing how the plastic-impregnated roving is wound on the assembled liner and heads.

Fig. 9 is a plan view of the tank showing how the roving strands overlap the head rim and each other.

With reference now to the drawings, the numeral 1 designates a collapsible cylindrical form of sheet steel or other suitable flexible material. Form 1 can be conveniently made of a single sheet having its mating edges provided with radially inturned abutting flanges 3. Flanges 3 may be firmly inter-connected by any suitable means, such as tongue and groove structures or by simple bolts (not shown). Form 1 may be supported by a pair of disks, provided with stepped peripheral notches 7 forming seats for the form 1, and further provided with axially extending shafts 9 by which the form 1 can be rotatably supported.

The outer face of form 1 is smooth and may be coated with any suitable "mold-release" substance before use.

Numeral 11 designates the cylindrical liner for the tank. While liner 11 could be cast, wound or otherwise conventionally formed, we prefer that it be formed of a sheet of glass-fiber cloth impregnated with a plastic substance before or after placing on form 1, or both. A narrow overlap seam 13 may be employed to increase the strength of liner 11, if desired.

The plastic materials used may be selected from a wide variety of heat resistant plastics now available (such as polyester resins) and they may be of the exothermic-setting or thermo-setting varieties. For the heads and the liner we prefer to use a "rigid" plastic, such as "Laminac 4116" manufactured by the American Cyanamid Co. of Bridgeville, Penna. For impregnating the strands of the re-inforcing roving, it is preferable to employ a blend of rigid and flexible plastics in a ratio of the order of 80:20. "Laminac 4134" is a suitable flexible plastic. Both plastics are mixed with the indicated amounts of catalytic or curing agents (such as "Lupersol DDM", a 60% solution of methyl ethyl ketone peroxide in dimethyl-phthalate).

The tank heads 21 are formed by laying a plurality of porous, fibrous disks, saturated with liquid plastic, in the lower mold 23 of a pair of die molds, and compressing them under relatively low pressures into the shape shown in Fig. 5. All the disks can be made of glass-fiber cloth, or some of the intermediate ones can be formed of matted chopped fibers. We prefer to alternate matted disks 25 between cloth disks 27 (Fig. 4), thus insuring that there will be no possibility of a capillary leak-path defined by transversely alined fibers. The edges of the disks 25 and 27 may be notched at 29 to minimize wrinkling at the cylindrical-flanged edge 31. Small washer-like disks 33 may be added to build up the thickness at the spud-opening area 35. A tapered threaded plug 37 is placed in an axial socket in the mold half 23 prior to forming the head. After forming, the plug 37 is unscrewed from the spud hole to leave a hole having molded threads therein.

The heads 21 are formed with a relatively short radius of curvature to increase their strength for a given wall thickness, and they are provided with flat marginal steps 39 between their spherical surfaces and the cylindrical flanges 31. Steps 39 provide bearing surfaces for the passes of roving which firmly hold the heads and the side wall of the tank unitarily assembled, as will be fully described later.

It should be here noted that while we prefer that the disks and the roving be made of glass fibers, it is obvious that other metallic or non-metallic filamentary materials can be used. Disks 27 and liner 11, for examples, could be formed of woven-wire or perforated-metal screening. However, where an embedded electric heater is employed, it is preferable that a non-metallic re-enforcing material be used.

When the liner shell 11 has hardened, the form 1 is collapsed, as shown in Fig. 1, and is removed. Flanges 31 of heads 21 are then pressed into (or over) the ends of the liner shell. The overlapping surfaces are preferably cemented, thermoplastically welded or otherwise firmly adhered to each other. We have found that "Permabond Cement 1300" manufactured by Polymer Chemical Co. of Cincinnati, Ohio, is an excellent cement for this joint.

Next a pair of mandrels 41 (Fig. 2) are screwed into the spud openings to form an axle for rotatably supporting the head-supported liner shell 11 in the apparatus of Fig. 2. Of course it is contemplated that quick-acting chucks of more complicated design will be employed for mass-production, in place of the supporting device illustrated. The winding apparatus comprises a carriage (schematically represented by one of its end members 43) adapted to be moved back and forth on rollers 45 by riding in conventional tracks. Shell 11 is rotated by a pulley 47 on the end of mandrel 41. Pulley 47 is driven by motor 49, by pulley 51 mounted on the shaft of motor 49, and by a belt 53 around said pulleys. Motor 49 is mounted on carriage 43 for movement therewith.

As liner shell 11 is rotated by motor 49, the carriage 43 is oscillated axially of the liner shell by any suitable means, such as the hydraulic or pneumatic device 55. Device 55 comprises a double-acting cylinder 57, a piston 59, and a piston rod 61 by which piston 59 drives the carriage 43. Fluid lines 63 are connected to automatic or manual controls for effecting the carriage movements needed to wind the roving cords 65 at the desired pitch.

A plurality of balls of roving 67 are supported in any desired manner (as by a platform 68) to supply the cords 65 to the apparatus. These cords may be of any size and composition within reasonable limits. We have found to be satisfactory, cords formed of sixty or so strands of about 200 filaments each and which under about two pounds of tension flatten against the liner shell into ribbons approximately ⅛ inch wide.

These cords 65 have a tensile strength of about 60 pounds. The cords 65 pass upwardly from balls of roving 67 and pass thru eyes 69 into the container 71 for the fluid plastic substance. Container 71 includes a plurality of rounded bars (or rollers) 73 which cause the roving cords to pass tortuously thru the plastic bath with a sufficient number of undulations to insure thoro impregnation of the strands of the cords. The cords 65 then leave the container 71, passing over its curved lip 75, between said lip 75 and a squeegee 77 which squeezes out and removes any excess plastic which otherwise might adhere to the cords. Squeegee 77 can be formed of flexible, semi-flexible, or rigid metal, plastic, or other suitable material, and can be resiliently mounted by means (not shown) permitting adjustment of its pressure against the cords 65. Rollers similar to wringer rollers obviously could be substituted for the lip 75 and blade 77.

Container 71 is preferably pivotally mounted, as by a post 79 which passes thru a platform 81 swivelly attached to post 79 as by collars 83. This pivotal mounting permits the container to "follow" the changing angle of delivery of the cords, thus permitting them to leave the receptacle 71 at right angles to its lip 75 at all times.

Since the bursting stresses in a tubular device of this type is approximately twice as great circumferentially as it is longitudinally, it is desirable that the roving be wound with a lead angle of between 20 and 40 degrees so that the roving will have a circumferential extent and tensile component about twice the longitudinal values. However, this angle may have to be varied beyond this range to meet other requirements, such as proper spacing of the contiguous strands, and sufficient "dwell" at the ends of the helical windings where the cords engage over the flat shoulders 39 of the heads 21.

We have also found that the movement pattern of the carriage should be such that it "dwells" at the end of each oscillation for a time sufficient to produce a (straight) chord 85 subtending an arc of about 45° (Fig. 9). If the dwell chord is shorter, the cord 65 tends to slip off the shoulder toward the edge; if longer, it tends to loosen by moving toward the center of the head. The proper length of chord, however, varies with variations in the pitch of the helix. Thus in winding, the cords 65 start each new cycle about 45° further around the head than the comparable point in the preceding cycle. And since the eight (more or less) ⅛ inch cords 65 make a ribbon about one inch wide, it is apparent that the gain angle should vary slightly from 45° so that when the cycles bring the roving back to its starting point, it will be stepped approximately an inch away from the first roving ribbon (on centers) to insure a uniform distribution of the re-inforcing cords. Three to ten or more complete layers (depending upon pressure requirements) should be wound for best results.

The tank and method of this invention are admirably adapted for easy, effective, and inexpensive incorporation of an electric resistance-wire heater, which can be embedded in the walls thermally and spatially close to the inner surface of the tank. This may consist of a conventional, round wire 87 (Figs. 3 and 7) or nickel-chromium alloys, or the like, for easy installation, or of flat metallic ribbon resistance (not shown) for more efficient heat-transfer. In either case the location of the resistor close to the water chamber will insure its operating at relative low temperatures so as not to damage the plasic or burn itself out. Heavy-gauge terminals 89 prevent overheating of the terminal area.

Pound for pound, the tank of this invention is stronger than steel tanks now being used. And its life span is many times longer since the plastic is chemically refractory to all community-used waters.

While we have disclosed by way of illustration certain preferred embodiments of our invention, and methods and apparatus for their fabrication, it is to be understood that many changes can be made in the size, shape, composition and arrangement of the parts of the article and apparatus, and in the nature and sequence of the process steps, without departing from the spirit of the invention defined by the subjoined claims.

Having thus described our invention, what we claim as new and desire to secure by Letters Patent of the United States is:

1. A re-inforced tank for water heaters, comprising: side wall means formed of heat-refractory initially plastic material adapted to harden after being shaped to form said side wall means, and a multiplicity of helically wound strands of filaments of a high-tensile-strength material embedded in and intimately bonded with the material of said side wall means, said filaments defining layers in said side wall means at least some of which layers have substantially all of the filaments comprising the same extending substantially parallel to the surfaces of said side wall means, and end wall means held assembled with said side wall means by passes of said strands across the edges thereof.

2. A tank according to claim 1 and in which said plastic is of the self-setting type.

3. A tank according to claim 1 and in which said plastic is a polyester resin.

4. A tank according to claim 3 and in which said resin comprises primarily "Laminac 4116."

5. A tank according to claim 1 and in which said wall means include convex end walls die-molded of plastic-impregnated laminae of interlaced glass filaments.

6. A tank according to claim 1 and in which said wall means comprise layers of plastic-impregnated loosely assembled filamentary roving cords helically wound under tension to form a laminated cylindrical structure having a relatively high ratio of re-inforcing material to plastic material.

7. A tank according to claim 6 and in which said ratio is in excess of 50:50 by weight.

8. A tank according to claim 7 and in which said helically wound cords extend beyond the ends of said cylindrical structure and cross over the edges of the end walls of said tank so as to hold the same rigidly attached to the walls defined by said plastic-saturated cords.

9. A tank according to claim 1 and in which said end wall means are convex and have narrow marginal seats presenting flat surfaces approximately perpendicular to the axis of said tank, and in which said extensions of said helically wound cords extend across said surfaces as chords subtending angles of the order of forty-five degrees.

10. A tank according to claim 1 and in which said helical windings cross each other medially of said tank at angles of the order of sixty degrees.

11. A tank according to claim 1 and in which said tank additionally comprises a resistance wire embedded in said wall means closely adjacent the inner surface thereof whereby an efficient and economical heating means for water in said tank is produced.

12. A tank according to claim 11 and in which said resistance wire is a relatively flat ribbon lying flatwise against the liner shell of said tank, is wound as a double helix, and has large-mass terminals to prevent overheating where the terminals connect with said resistance wire and pass thru said wall means to the exterior.

13. A tank according to claim 1 and in which said wall means include a pre-formed plastic liner cylinder over which layers of plastic-impregnated cords are helically wound at pitch angles of the order of thirty degrees.

14. A tank according to claim 13 and in which said liner cylinder has a re-inforcing member of woven glass cloth embedded therein.

15. Apparatus for fabricating a cord re-inforced plastic tank, comprising: means for holding the heads of a tank mounted on a relatively thin lining shell extending therebetween; means for rotating said heads and shell about their common axis; means for feeding cords to said shell under tension; means for producing oscillatory endwise relative motion between said shell and said means for feeding cords thereto, so as to produce a helical winding of said cords on said shell; and means for applying liquid plastic to said cords as they are wound upon said shell to build up said wall of overlapped wound helical layers.

16. Apparatus according to claim 15 and in which said means for applying liquid plastic includes a container for said plastic, guide devices for said cords to force the same down into the bath of plastic in said container, and a device for removing any excess quantities of said plastic adhering to said cords.

17. A method of fabricating a tank for water heaters, comprising: preforming end-wall members; placing a liner cylinder between said end-wall members; mounting the cylinder so formed for rotation about its axis; helically winding plastic-saturated re-inforcing cords in a plurality of layers over said liner cylinder and chord-wise over the marginal portions of said end walls, so as to firmly tie said end walls to the side walls formed by said liner cylinder and said layers of helically wound cords.

18. A method according to claim 17 and additionally comprising the step of embedding a resistance heating element in the side walls so formed, said element being located relatively close to the inner surface of said side walls.

References Cited in the file of this patent

UNITED STATES PATENTS

| | | |
|---|---|---|
| 1,838,680 | Hudson | Dec. 29, 1931 |
| 2,290,386 | Schlinder | July 21, 1942 |
| 2,327,790 | Hopkins | Aug. 24, 1943 |
| 2,372,983 | Richardson | Apr. 3, 1945 |
| 2,467,999 | Stephens | Apr. 19, 1949 |
| 2,568,848 | Enabnit | Sept. 25, 1951 |

FOREIGN PATENTS

| | | |
|---|---|---|
| 586,183 | Great Britain | Mar. 10, 1947 |
| 839,018 | France | Dec. 26, 1938 |